US010838058B2

(12) United States Patent
Lekutai et al.

(10) Patent No.: US 10,838,058 B2
(45) Date of Patent: *Nov. 17, 2020

(54) PATTERN RECOGNITION BASED ON MILLIMETER WAVE TRANSMISSION IN WIRELESS COMMUNICATION NETWORKS

(71) Applicant: T-Mobile USA, Inc., Bellevue, WA (US)

(72) Inventors: Gaviphat Lekutai, Kirkland, WA (US); Darshan Shah, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/696,730

(22) Filed: Nov. 26, 2019

(65) Prior Publication Data

US 2020/0233077 A1 Jul. 23, 2020

Related U.S. Application Data

(63) Continuation of application No. 16/250,830, filed on Jan. 17, 2019, now Pat. No. 10,495,746.

(51) Int. Cl.
*G01S 13/00* (2006.01)
*G01S 13/87* (2006.01)
(Continued)

(52) U.S. Cl.
CPC .......... *G01S 13/876* (2013.01); *G01S 5/0215* (2013.01); *G06K 7/10009* (2013.01); *G06K 9/6201* (2013.01)

(58) Field of Classification Search
CPC . G01S 13/876; G01S 5/0215; G06K 7/10009; G06K 9/6201
See application file for complete search history.

(56) References Cited

U.S. PATENT DOCUMENTS 10,175,340 B1 1/2019 Abari et al.
10,495,746 B1 12/2019 Lekutai et al.
(Continued)

FOREIGN PATENT DOCUMENTS

JP 2016138796 8/2016
KR 20160115324 10/2016
WO WO2018009189 1/2018

OTHER PUBLICATIONS

Office Action for U.S. Appl. No. 16/250,830, dated Jun. 21, 2019, Lekutai, "Pattern Recognition Based on Milimeter Wave Transmission in Wireless Communication Networks", 8 pages.
(Continued)

*Primary Examiner* — Mazda Sabouri
(74) *Attorney, Agent, or Firm* — Lee & Hayes, P.C.

(57) ABSTRACT

Architecture and techniques for identifying types of objects based upon disruption of signal strength of millimeter-wave (mmW) transmitted signals caused by objects interfering with or blocking transmitted signals within a wireless communication network. In particular, types of objects may be identified based upon drops in signal strength due to objects moving between a transmission point and a receiving device. Based on factors including one or more of a size of an object, materials that make up the object, etc., the object causes a drop in received signal strength, thereby causing a change in a pattern of received signal strength. The changed pattern may be compared with base patterns that are correlated with a type or identity of an object in order to identify the object.

20 Claims, 7 Drawing Sheets

(51) Int. Cl.
    *G01S 5/02*       (2010.01)
    *G06K 9/62*       (2006.01)
    *G06K 7/10*       (2006.01)

(56) References Cited

U.S. PATENT DOCUMENTS

| | | |
|---|---|---|
| 2004/0158390 A1 | 8/2004 | Mukaiyama |
| 2008/0217536 A1 | 9/2008 | Sekiguchi et al. |
| 2010/0182434 A1 | 7/2010 | Koch et al. |
| 2011/0244881 A1 | 10/2011 | Bando et al. |
| 2011/0248880 A1 | 10/2011 | Miyahara et al. |
| 2011/0267599 A1 | 11/2011 | Hurley |
| 2012/0194376 A1* | 8/2012 | Daly ................ G01S 13/887 342/22 |
| 2013/0038484 A1 | 2/2013 | Ohkado et al. |
| 2014/0339905 A1 | 11/2014 | Moritsuka et al. |
| 2017/0263129 A1 | 9/2017 | Kasami |
| 2018/0088227 A1 | 3/2018 | Igawa et al. |
| 2018/0220429 A1 | 8/2018 | Hazebrouck et al. |
| 2019/0073907 A1 | 3/2019 | Takaki |

OTHER PUBLICATIONS

The PCT Search Report and Written Opinion dated May 12, 2020 for PCT Application No. PCT/US2020/013294, 9 pages.

* cited by examiner ated devices combining one or more of the preceding devices, and/or the like. As such, the mobile devices may range widely in terms of capabilities and features.

PATTERN RECOGNITION BASED ON MILLIMETER WAVE TRANSMISSION IN WIRELESS COMMUNICATION NETWORKS

CROSS-REFERENCE TO RELATED APPLICATION

This patent application is a continuation of and claims priority to U.S. Utility patent application Ser. No. 16/250,830, filed Jan. 17, 2019, which is fully incorporated herein by reference.

BACKGROUND

In recent years, mobile telecommunication devices have advanced from offering simple voice calling services within wireless communication networks to providing users with many new features. Mobile telecommunication devices now provide messaging services such as email, text messaging, and instant messaging; data services such as internet browsing; media services such as storing and playing a library of favorite songs; location services; and many others. In addition to the new features provided by the mobile telecommunication devices, users of such mobile telecommunication devices have greatly increased. Such an increase in users is only expected to continue and, in fact, it is expected that there could be a growth rate of twenty times more users in the next few years alone.

As use of wireless communication networks continues to increase, operators of wireless communication networks continue to work to improve the features and quality of services provided by wireless communication networks. Thus, many wireless communication networks are operating per standardized protocols provided by the 3rd Generation Partnership Project (3GPP). In particular, wireless communication networks are operating and evolving based on third generation (3G) protocols, fourth generation (4G) (also referred to as Long Term Evolution (LTE)) protocols, and now fifth generation (5G) protocols. While the 3G and/or 4G wireless communication network protocols operate in a 1.8-2 gigaHertz (GHz) and 2-8 GHz, respectively, the 5G networks are operating according to a protocol utilizing millimeter-wave (mmW) bands for transmission, e.g., 28 GHz or 39 GHz bands.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

DETAILED DESCRIPTION

Figure 1A:
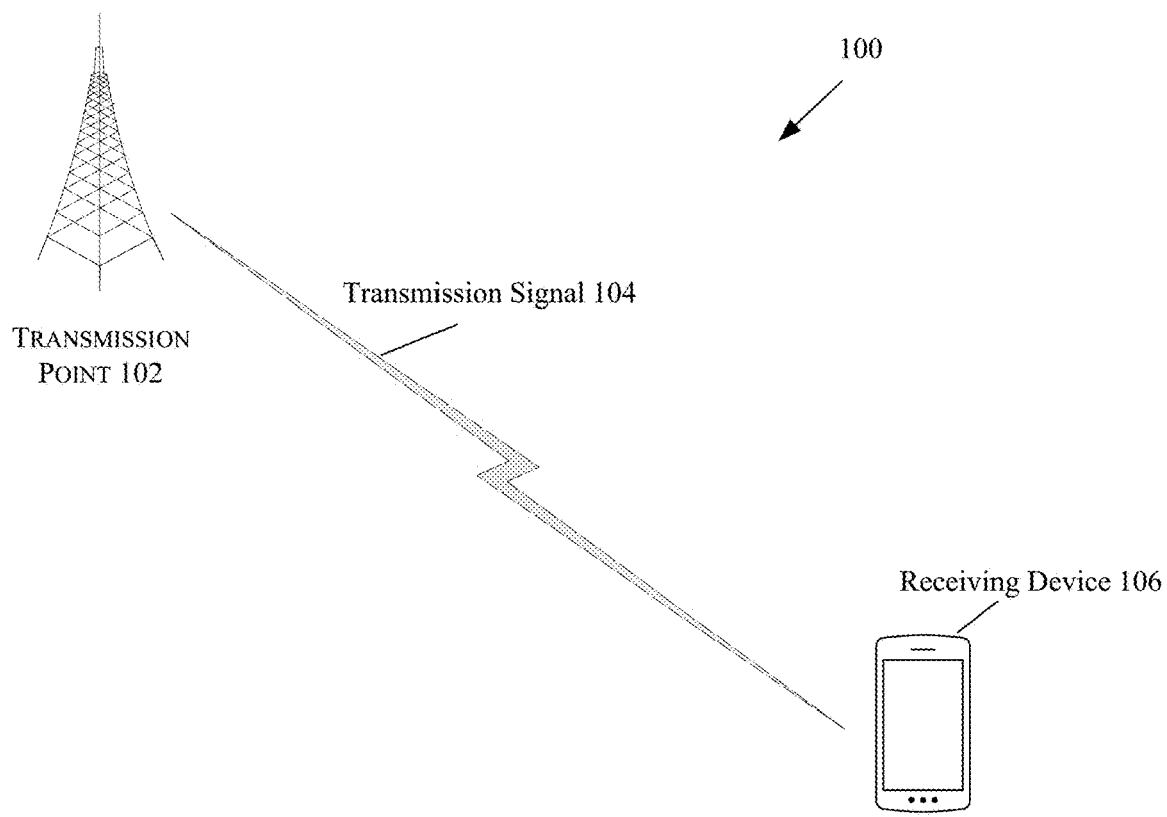
FIG. 1A schematically illustrates an example arrangement of a transmission point of a wireless communication network transmitting a transmission signal to a receiving device, in accordance with various configurations.

Described herein are architecture and techniques for identifying types of objects based upon disruption of signal strength of millimeter-wave (mmW) transmitted signals caused by objects blocking transmitted signals. In particular, types of objects may be identified based upon drops in received signal strength due to objects moving between a transmission point and a receiving device.

When transmission signals are transmitted in a wireless communication network using the mmW band, if the transmission signal is blocked by an object, the signal strength drops. For example, when the transmission signal is blocked or interfered with by an object between a transmission point, e.g., a base station, an access point, etc., and a receiving device, e.g., a mobile communication device (hereinafter mobile device), the Received Signal Strength Indication (RSSI) and/or Carrier to Interference plus Noise Ratio (CINR) decreases. The decrease in signal strength may correspond to the size of the object, the materials that the object is made of, etc. For example, if a bus passes between the transmission point and the receiving device, the signal strength may drop in accordance with the size of the bus and/or the materials that the bus is made of, e.g., metal frame and windows. If a truck passes between the transmission point and the receiving device, the drop in signal strength may be different in comparison to the drop in signal strength caused by the passage of the bus between the transmission point and the receiving device.

Mobile devices may comprise any appropriate device, e.g., a stationary device or a portable electronic device, for communicating over a wireless communication network. Examples of such devices include mobile telephones, cellular telephones, internet protocol (IP) telephones, mobile computers, Personal Digital Assistants (PDAs), radio frequency devices, handheld computers, laptop computers, tablet computers, palmtops, pagers, devices configured as IoT devices, IoT sensors that include cameras, integr Thus, data may be gathered relating to changes in signal strength patterns, e.g., drops in signal strength, based upon the size, shape and/or materials relating to various objects. The data relating to the change in signal strength patterns may be stored in a database as base signal strength patterns, where changes in signal strength patterns may be correlated with types or identities of objects that may block or interfere with transmission signals and cause the drops in signal strength. Values, percentages, etc., of signal strength drops may also be gathered and correlated with the identity or type of objects for use in identifying the identities or types of objects.

The data in the database may be used to identify objects when a change in signal strength pattern is detected. For example, a receiving device in the form of a mobile device may be configured, e.g., include an app stored thereon, to monitor the signal strength received by the mobile device. When a change in signal strength is detected by the app, the change in the signal strength pattern may be compared with the patterns stored in the database. When the pattern is matched, the mobile device may determine that, for example, a bus passed between the transmission point and the mobile device.

Thus, in configurations, the changes in signal strength patterns received by a mobile device may be utilized to generate and provide alerts to a user of the mobile device. For example, an alert may be generated to inform the user that a school bus is approaching, a taxi or other vehicle is about to arrive, etc. Additionally, the change in patterns may be utilized as a security device or system. For example, a mobile device may be placed adjacent to a window. If a person passes by the mobile device, thereby disrupting the received signal strength, it may be determined that a person is close to a home, in a yard, etc. In response, an app on the mobile device may be utilized to turn on lights, sound an alarm, contact emergency services, etc. Thus, the mobile device and changes in signal strength patterns may be utilized to monitor a yard, a structure such as a home or a building, a car, etc.

The receiving device may also be placed at an intersection to monitor traffic as the traffic passes through the intersection. Thus, the number of vehicles and/or the types of vehicles passing through the intersection may be monitored by the receiving device, which monitors changes in signal strength. Based at least in part on the monitoring, reports may be generated based on the traffic. Such reports may be used by, for example, traffic engineers, for improving traffic flow through the intersection, along roadways, etc.

The database that includes the various signal strength patterns and the identities of the objects that generally cause the changes in signal strength patterns may be stored on the receiving device, at a central server, in a network accessible system, e.g., the Cloud, etc. Additionally, the receiving device may be a mobile device or may be a stationary device.

FIG. 1A schematically illustrates an example arrangement 100 of a transmission point 102, e.g., a base station, an access point, etc., of a wireless communication network, transmitting a transmission signal 104 to a receiving device 106. In configurations, the transmission point 102 is configured to operate in accordance with 3rd Generation Partnership Project (3GPP) Fifth Generation (5G) protocols and thus, the transmission signal 104 is a millimeter-wave (mmW) signal.

Figure 1B:
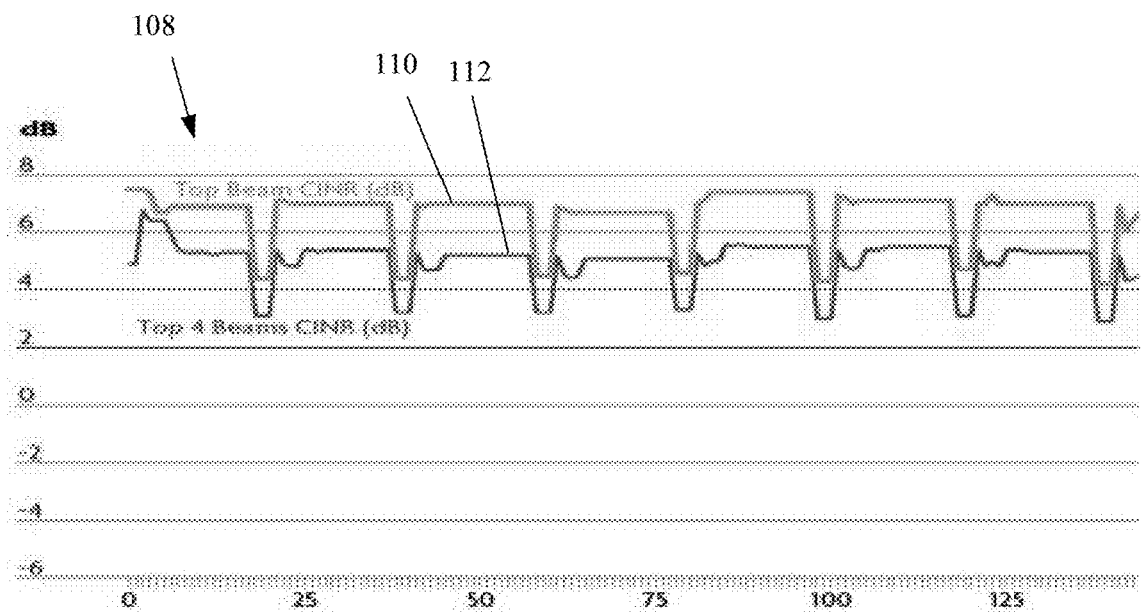
FIG. 1B illustrates an example mmW signal transmission strength pattern for a Carrier to Interference plus Noise Ratio (CINR) signal strength pattern for the example arrangement of FIG. 1A, in accordance with configurations.

FIG. 1B illustrates an example mmW Carrier to Interference plus Noise Ratio (CINR) signal strength pattern 108 for the example arrangement of FIG. 1A. In configurations, a Received Signal Strength Indication (RSSI) signal strength pattern may be used instead of or in addition to the CINR signal strength pattern 108. The example signal strength pattern 108 generally occurs when there is no blocking or interference between the transmission point 102 and the receiving device 106. The signal strength pattern 108 illustrates a top beam CINR signal strength pattern 110 and a top four beams CINR signal strength pattern 112. For example, antennas for 5G networks transmit several beams (similar to pilot signals in 3G networks) as a way of saying "is anyone out there?" Such beams come from antenna elements inside an antenna panel of the antenna. Generally, there are either 256 antenna elements, 64 or 16 elements. There are many beams scanning (searching) for receiving devices 106 inside the antenna's coverage area. Scanning starts, for example, from left to right and up-down of the antenna elements inside the antenna panel. Each beam comes to the receiving devices 106 from different angles (reflection, diffraction). Thus, the top 4 beams of good signal strength (CINR) are kept within a time window and the best beam (for example, beam number n) with the best signal strength is chosen as the top beam. A receiving device 106 reports beam number n to the base station that includes the antenna ("I see you and I pick beam n"). The base station pairs beams of the receiving device 106 with base station beam number n to establish communication of the receiving device 106 with the base station.

As previously noted, the receiving device 106 may be a mobile device, e.g., a stationary device or a portable electronic device, for communicating over a wireless communication network. Such mobile devices may be configured to operate and receive transmission signals 104 within wireless communication networks. Thus, since the transmission point 102 is configured to operate according to 5G protocols, the receiving device 106 includes at least one radio configured to receive 5G transmission signals, e.g., mmW transmission signals 104. Examples of receiving devices 106 include, but are not limited to, mobile telephones, cellular telephones, internet protocol (IP) telephones, mobile computers, Personal Digital Assistants (PDAs), radio frequency devices, handheld computers, laptop computers, tablet computers, stationary or desktop computers, palmtops, pagers, devices configured as IoT devices, IoT sensors that include cameras, integrated devices combining one or more of the preceding devices, and/or the like. As such, the mobile devices may range widely in terms of capabilities and features.

Figure 2A:
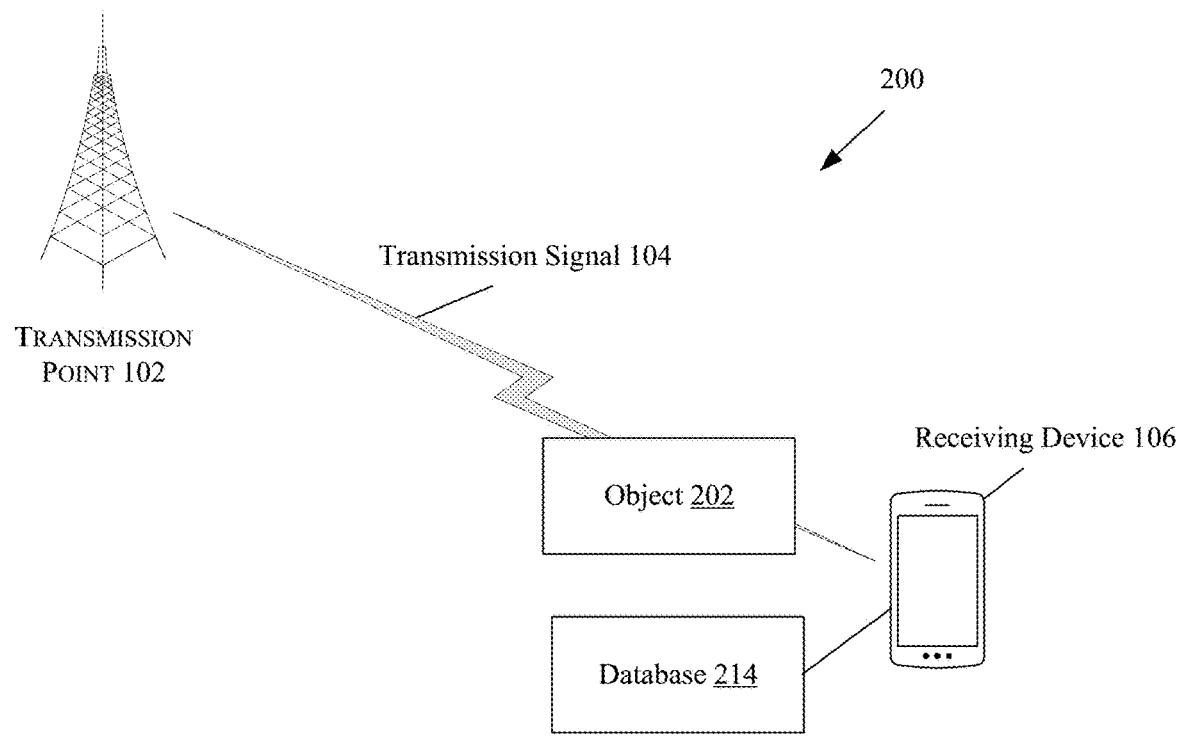
FIG. 2A schematically illustrates an example arrangement of the transmission point transmitting the transmission signal to the receiving device with an object between the transmission point and the receiving device, in accordance with various configurations.

FIG. 2A schematically illustrates an example arrangement 200 of the transmission point 102 transmitting the transmission signal 104 to the receiving device 106. In the example illustrated in FIG. 2A, an object 202 is located between the transmission point 102 and the receiving device 106. Thus, the object 202 is blocking or interfering with the transmission signal 104 between the transmission point 102 and the receiving device 106.

Figure 2B:
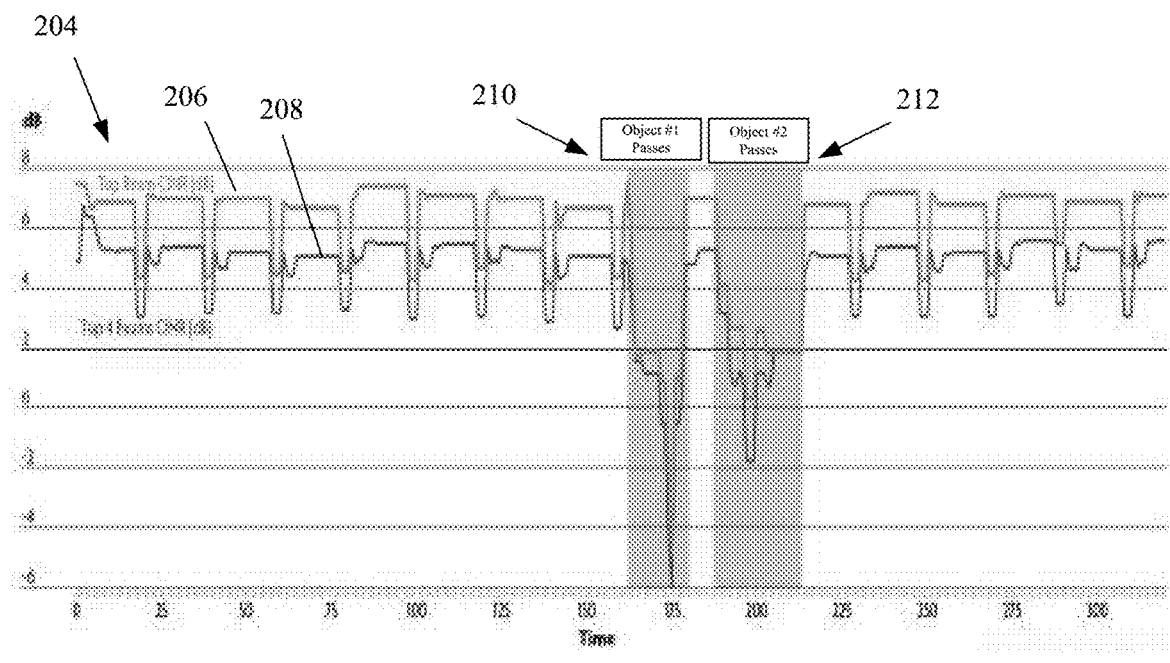
FIG. 2B illustrates an example mmW signal transmission strength pattern for a CINR signal strength pattern for the example arrangement of FIG. 2A, in accordance with configurations.

FIG. 2B illustrates an example mmW signal transmission strength pattern 204 for a CINR signal strength pattern for the example arrangement of FIG. 2A. The signal strength pattern 108 illustrates a top beam CINR signal strength pattern 206 and a top four beams CINR signal strength pattern 208. As can be seen in FIG. 2B, when the object 202 moves into the transmission path of the transmission signal 104, the signal strength pattern changes at 210, e.g., the signal strength drops. Thus, for example, the object 202 may be a bus that may move through the transmission signal 104 and interfere with the signal strength of the transmission signal 104 received by the receiving device 106. As can be seen in FIG. 2 at 212, if another type of object 202 moves through the transmission path of the transmission signal 104, for example, a car or a delivery truck, the signal strength 204 is disrupted again, e.g., the signal strength drops, but in a different pattern. The decrease in signal strength may correspond to the size of the object 202, the materials that the object 202 is made of, etc. For example, if a bus passes between the transmission point 102 and the receiving device 106, the signal strength may drop in accordance with the size of the bus and/or the materials that the bus is made of, e.g., metal frame and windows, as can be seen at 210. If a car passes between the transmission point 102 and the receiving device 106, the drop in signal strength may be different, e.g., less due to the difference in size and/or materials, in comparison to the drop in signal strength caused by the passage of the bus between the transmission point 102 and the receiving device 106, as may be seen at 212.

Thus, various signal strength pattern changes, e.g., signal strength pattern changes 210, 212, may be gathered and correlated with a type or identity of object 202 that causes the signal strength pattern changes. The gathered signal strength patterns may be stored in a database 214 as base signal strength patterns. The database 214 may be stored in one or more locations such as, for example, on the receiving device 106, in a central server (not illustrated), in a network accessible site, e.g., the Cloud, etc. The various signal strength pattern changes may be gathered, for example, by people watching objects 202 and monitoring signal strength pattern changes received by a receiving device 106, using camera(s) to identify objects 202 in conjunction with a receiving device 106 and the received signal strength, using artificial intelligence (AI), using neural networks, etc. Values, percentages, etc., of signal strength drops may also be gathered, correlated with the identity or type of objects and stored for use in identifying the identities or types of objects.

The signal strength pattern changes in the database 214 may be used to identify objects 202 when a change in signal strength pattern is detected. For example, a receiving device 106 may be configured, e.g., include an app stored thereon, to monitor the signal strength received by the receiving device. When a change in signal strength is detected by the app, the change in the signal strength pattern may be compared with the patterns stored in the database 214. When the pattern is matched, the receiving device 106 may determine that, for example, a bus passed between the transmission point 102 and the receiving device 106.

In configurations, the changes in signal strength patterns for transmission signals 104 received by a receiving device 106 may be utilized to generate and provide alerts to a user of the corresponding receiving device 106. For example, a receiving device 106 may be located along a school bus route. An alert may be generated by the receiving device 106 to inform the user that a school bus is approaching. Likewise, an alert may be generated to inform the user that a taxi or other vehicle is about to arrive, one or more persons are about to arrive, etc. The alert may be transmitted to a mobile device or other electronic device of the user. In configurations, the alert may be generated and provided to a mobile device or other electronic device of the user by the database 214, which may be configured to determine the type and/or identity of the vehicle approaching.

Figure 3:
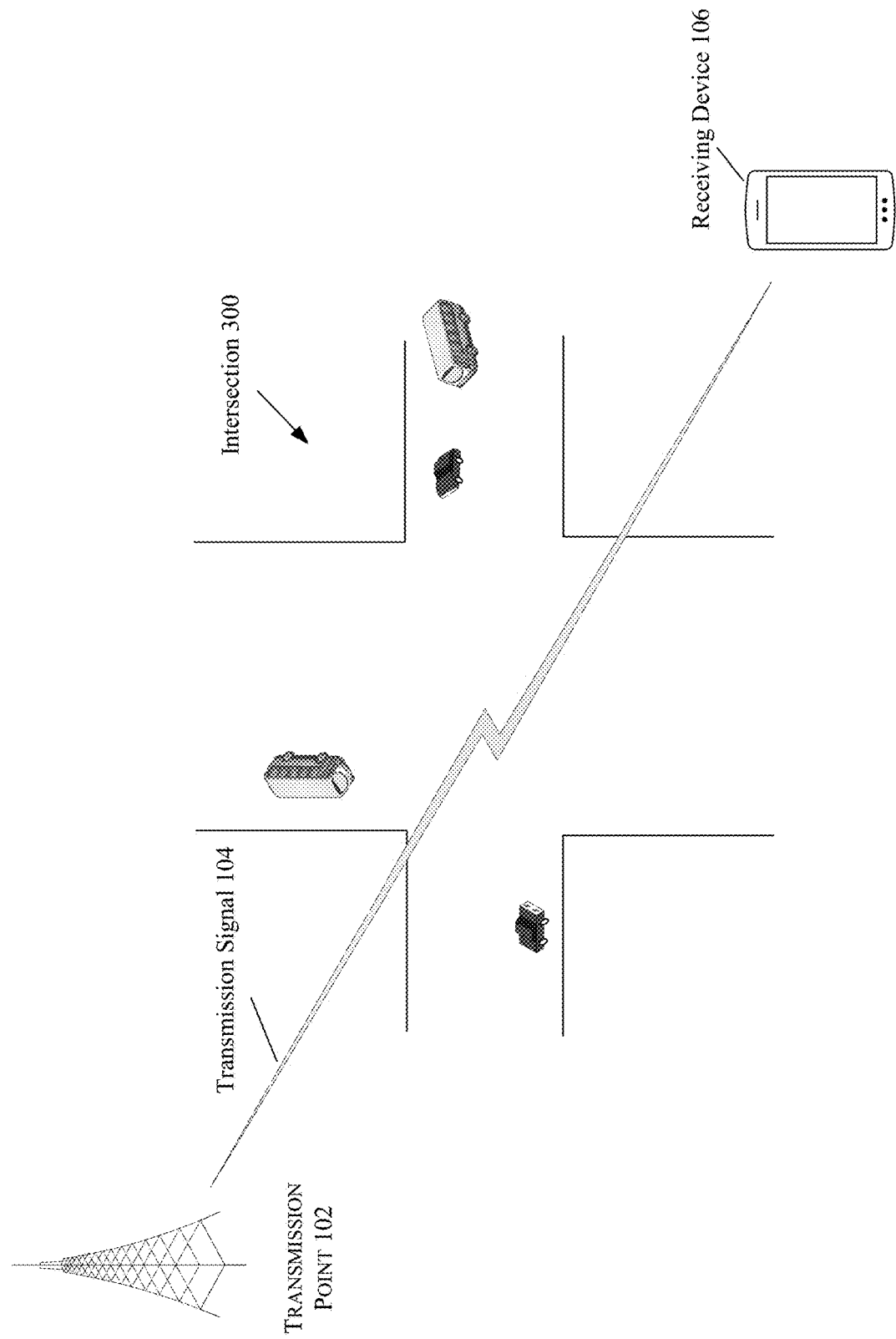
FIG. 3 schematically illustrates an example arrangement of a receiving device placed at an intersection to monitor traffic as the traffic passes through the intersection, in accordance with various configurations.

Referring to FIG. 3, in configurations, the receiving device 106 may be placed at an intersection 300 to monitor traffic as the traffic passes through the intersection 300. Thus, the number of vehicles and/or the types of vehicles passing through the intersection 300 may be monitored by the receiving device 106, which monitors changes in signal strength of transmission signals 104 from the transmission point 102. Based at least in part on the monitoring, reports may be generated based on the traffic. Such reports may be used by, for example, traffic engineers, for improving traffic flow through the intersection 300, along roadways, etc.

Figure 4:
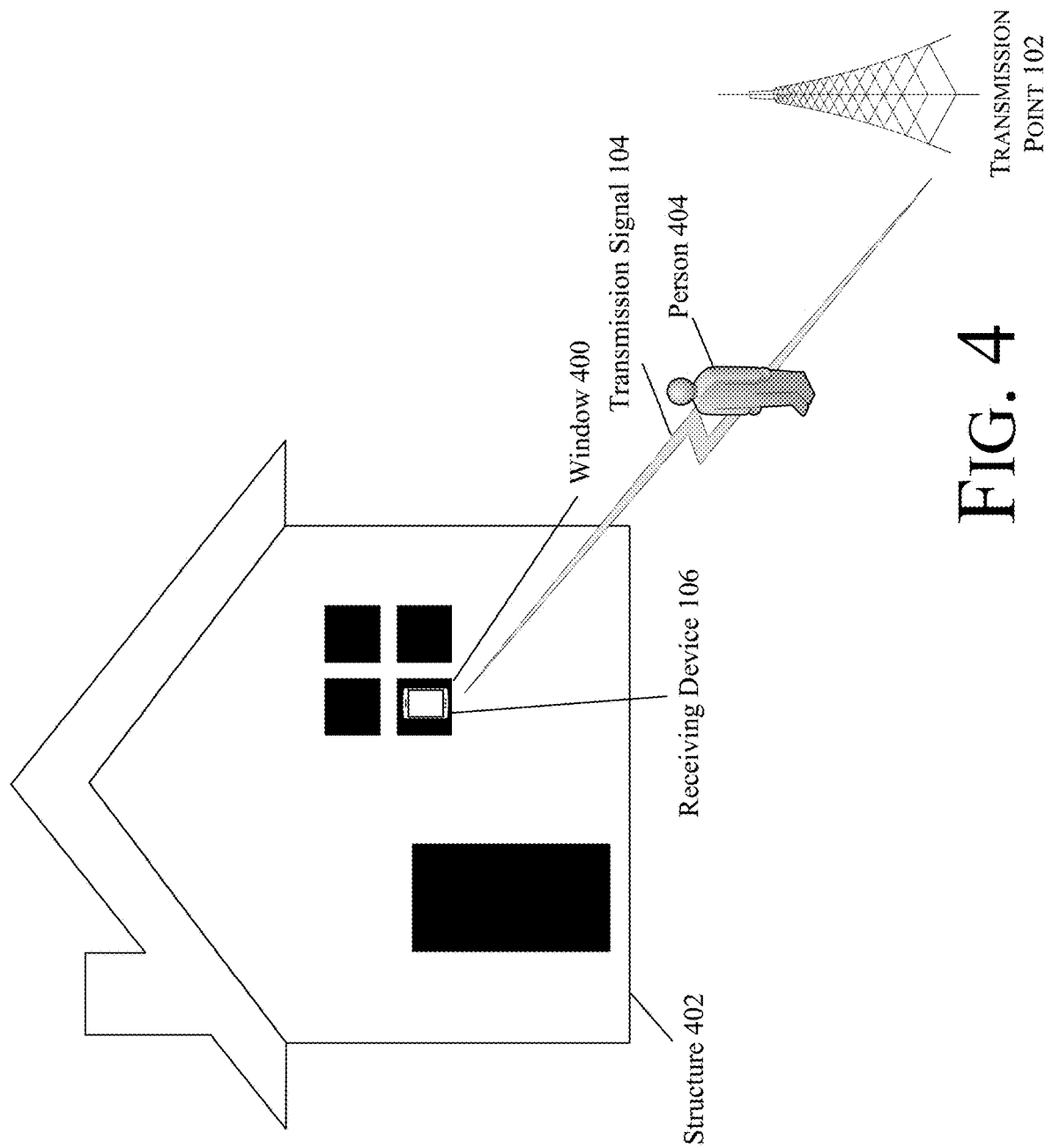
FIG. 4 schematically illustrates an example arrangement of a receiving device placed adjacent to a window of a structure to serve as a security device or system, in accordance with various configurations.

Referring to FIG. 4, changes in signal strength patterns may be utilized to allow a receiving device 106 to serve as a security device or system. For example, a receiving device 106 may be placed adjacent to a window 400 of a structure 402. If a person or persons 404 passes by the receiving device 106, thereby disrupting the received signal strength, it may be determined that a person or persons is close to the structure 402, e.g., a home, in a yard, close to a car, etc. In response, an app on the receiving device 106 may be utilized to perform one or more of turn on lights, sound an alarm, contact emergency services, etc. In configurations, the database 214, which may be configured to detect and determine the type and/or identity of the object, e.g., a person or persons, may perform one or more of turn on lights, sound an alarm, contact emergency services, etc. Thus, the receiving device 106 and changes in signal strength may be utilized to monitor a yard, a structure such as a home or a building, a car, etc.

Figure 5:
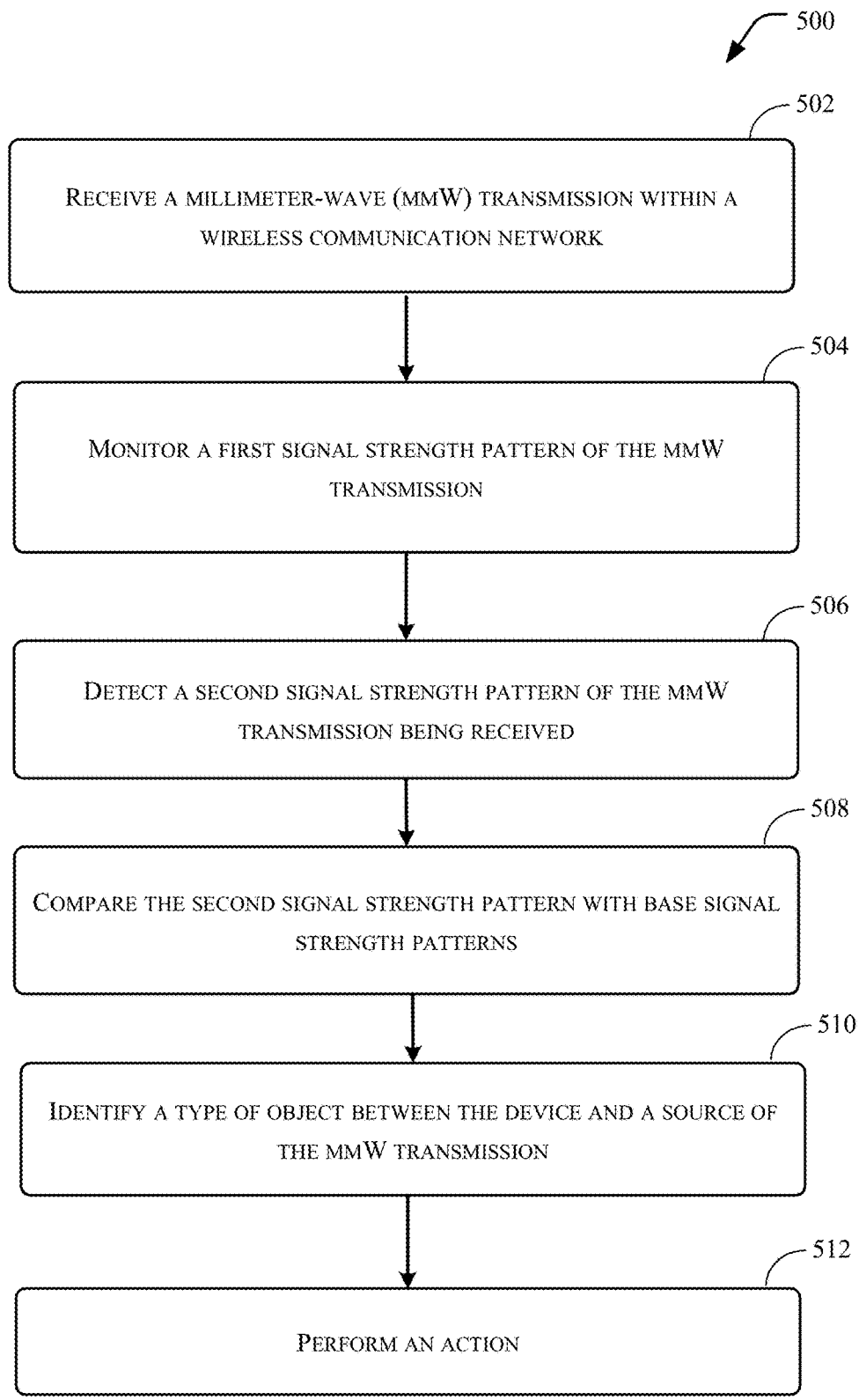
FIG. 5 is a flowchart illustrating a method of determining a location of a small cell access point in the wireless communication network of FIG. 1, in accordance with various configurations.

FIG. 5 is a flow diagram of an illustrative process that may be implemented within or in association with the arrangements of FIGS. 1-4. This process (as well as other processes described throughout) is illustrated as a logical flow graph, each operation of which represents a sequence of operations that can be implemented in hardware, software, or a combination thereof. In the context of software, the operations represent computer-executable instructions stored on one or more tangible computer-readable storage media that, when executed by one or more processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Furthermore, while the architectures and techniques described herein have been described with respect to wireless networks, the architectures and techniques are equally applicable to processor(s) and processing cores in other environments and computing devices.

FIG. 5 is a flow diagram illustrating an example method 500 of identifying objects based upon changes in signal strength of received transmission signals at a receiving device within a wireless communication network. As illustrated, at block 502, a millimeter-wave (mmW) transmission within the wireless communication network is received. For example, the mmW transmission is received by a device, e.g., receiving device 106. At block 504, a first signal strength pattern of the mmW transmission is monitored. In configurations, the first signal strength pattern of the mmW transmission is monitored by the receiving device.

At block 506, a second signal strength pattern of the mmW transmission being received is detected. In configurations, the second signal strength pattern of the mmW transmission is monitored by the receiving device and is based, at least in part, on the monitoring of the first signal strength pattern. In configurations, the second signal strength pattern indicates a lower signal strength of the mmW transmission with respect to the first signal strength pattern. At block 508, the second signal strength pattern is compared with base signal strength patterns. In configurations, the base signal strength patterns are stored in a database, e.g., database 214.

At block 510, a type of object between the device and a source of the mmW transmission may be identified. In configurations, the type of object may be identified based at least in part on the comparing of the second signal strength pattern with the base signal strength patterns. At block 512, an action is performed, based at least in part on identifying the type of object. For example, the action may include one or more of monitoring traffic, generating an alert, turning on lights, sounding an alarm, contacting emergency services, etc.

Thus, changes in mmW transmission signals within 5G wireless communication networks may be used to identify objects based upon changes in signal strength due to objects interfering with the mmW transmission signals. The identifying of objects may be used to perform actions including one or more of monitoring traffic, generating an alert, turning on lights, sounding an alarm, contacting emergency services, etc.

Figure 6:
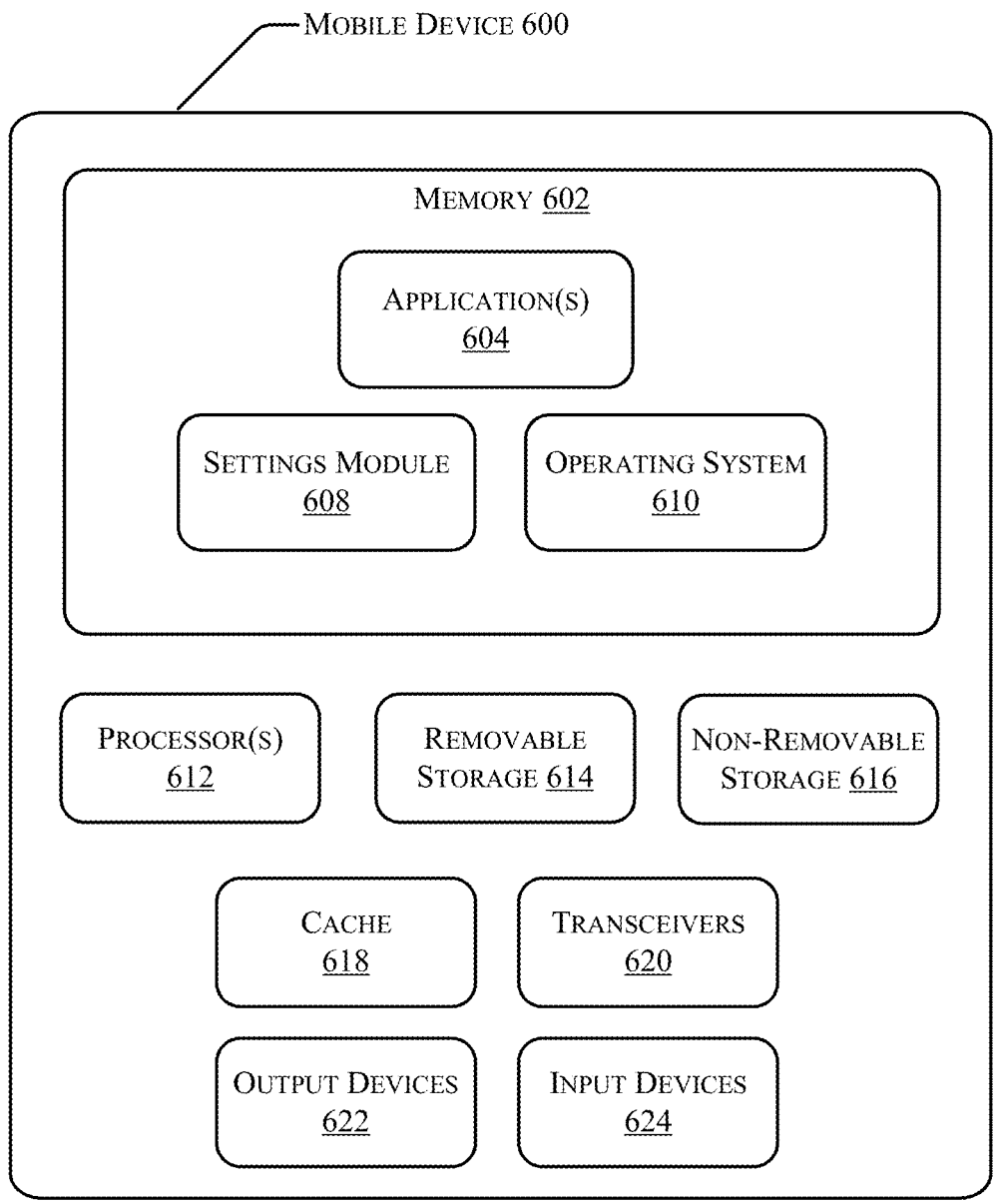
FIG. 6 schematically illustrates a component level view of an example mobile device configured for use in the arrangements of FIGS. 1-4, in accordance with various configurations FIG. 7 schematically illustrates a component level view of a server configured for use in the arrangements of FIGS. 1-4 to provide various functions described with respect to the arrangements of FIGS. 1-4, in accordance with various configurations.

FIG. 6 schematically illustrates a component level view of a mobile device 600, such as receiving device 106, configured to function within a wireless communication network, especially the arrangements described with respect to FIGS. 1-4. As illustrated, the mobile device 600 comprises a system memory 602, storing application(s) 604, e.g., an application (app) to identify types of objects based upon disruption of signal strength of mmW transmitted signals caused by objects blocking transmitted signals. In particular, such an application may monitor and detect changes in signal strength patterns and identify types of objects based upon drops in signal strength patterns due to objects moving between a transmission point and a receiving device, as described herein. Such an application may also perform various actions including one or more of monitoring traffic, generating an alert, turning on lights, sounding an alarm, contacting emergency services, etc.

The mobile device 600 also comprises a settings module 608 and an operating system 610. Also, the mobile device 600 includes processor(s) 612, a removable storage 614, a non-removable storage 616, cache 618, transceivers 620, output device(s) 622, and input device(s) 624. In various implementations, system memory 602 is volatile (such as RAM), non-volatile (such as ROM, flash memory, etc.) or some combination of the two. In some implementations, the processor(s) 612 is a central processing unit (CPU), a graphics processing unit (GPU), or both CPU and GPU, or any other sort of processing unit.

The mobile device 600 may also include additional data storage devices (removable and/or non-removable) such as, for example, magnetic disks, optical disks, or tape. Such additional data storage may include removable storage 614 and non-removable storage 616. Additionally, the mobile device 600 includes cache 618.

Non-transitory computer-readable media may include volatile and nonvolatile, removable and non-removable tangible, physical media implemented in technology for storage of information, such as computer readable instructions, data structures, program modules, or other data. System memory 602, removable storage 614, non-removable storage 616, and cache 618 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the mobile device 600. Any such non-transitory computer-readable media may be part of the mobile device 600. The processor(s) 612 may be configured to execute instructions, which may be stored in the non-transitory computer-readable media or in other computer-readable media accessible to the processor(s) 612.

In some implementations, the transceivers 620 include any sort of transceivers known in the art. For example, the transceivers 620 may include a radio transceiver that performs the function of transmitting and receiving radio frequency communications via an antenna. Also, or alternatively, the transceivers 620 may include wireless modem(s) to facilitate wireless connectivity with other computing devices. Further, the transceivers 620 may include wired communication components, such as an Ethernet port, for communicating with other networked devices.

In some implementations, the output devices 622 include any sort of output devices known in the art, such as a display (e.g., a liquid crystal display), speakers, a vibrating mechanism, or a tactile feedback mechanism. Output devices 622 also include ports for one or more peripheral devices, such as headphones, peripheral speakers, or a peripheral display.

In various implementations, input devices 624 include any sort of input devices known in the art. For example, input devices 624 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like. The input devices 624 may be used to enter preferences of a user of the mobile device 600 to define how the user wishes certain calls from third parties to be handled by the wireless communication network, as previously described herein.

Figure 7:
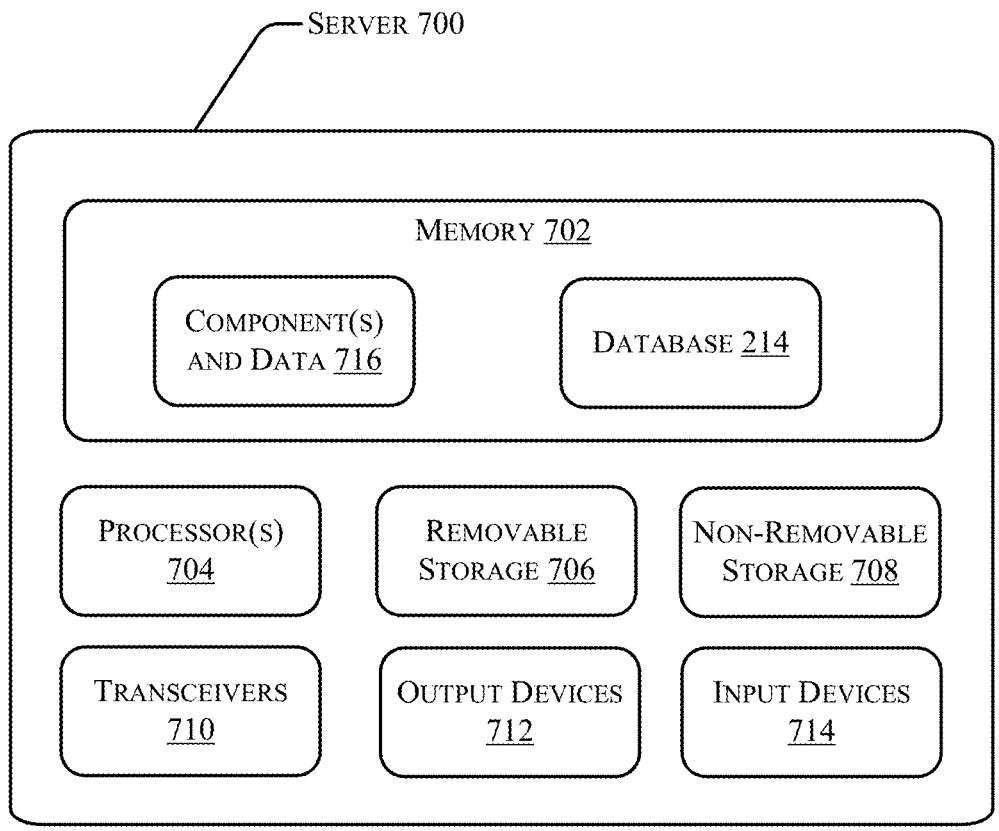

FIG. 7 illustrates a component level view of a server 700 configured for use within a wireless communication network, in order to provide various functionality according to the techniques described herein. For example, the server 700 may compare received signal strength patterns with base signal strength patterns and identify objects, e.g., objects 202. The server 700 may also perform various actions including one or more of monitoring traffic, generating an alert, turning on lights, sounding an alarm, contacting emergency services, etc.

As illustrated, the server 700 comprises a system memory 702 that may store data and one or more components and/or data 716 for interacting with mobile devices 600, e.g., receiving devices 106, as described herein. The system memory may also store a database of base signal strength patterns, e.g., database 214. Also, the server 700 includes processor(s) 704, a removable storage 706, a non-removable storage 708, transceivers 710, output device(s) 712, and input device(s) 714. The database of base signal strength patterns, e.g., database 214, may be stored in removable storage 760 and/or non-removable storage 708.

In various implementations, system memory 702 is volatile (such as RAM), non-volatile (such as ROM, flash memory, etc.) or some combination of the two. In some implementations, the processor(s) 704 is a Central Processing Unit (CPU), a Graphics Processing Unit (GPU), or both CPU and GPU, or any other sort of processing unit.

The server 700 may also include additional data storage devices (removable and/or non-removable) such as, for example, magnetic disks, optical disks, or tape. Such additional storage is illustrated in FIG. 7 by removable storage 706 and non-removable storage 708. The one or more of the memory 702, the removable storage 706 and/or the non-removable storage 708 may include module(s) and data 716 (illustrated in the memory 702). The module(s) and data 716 may include instructions executable by, for example, the processor(s) 704.

Non-transitory computer-readable media may include volatile and nonvolatile, removable and non-removable tangible, physical media implemented in technology for storage of information, such as computer readable instructions, data structures, program modules, or other data. System memory 702, removable storage 706 and non-removable storage 708 are all examples of non-transitory computer-readable media. Non-transitory computer-readable media include, but are not limited to, RAM, ROM, EEPROM, flash memory or other memory technology, CD-ROM, Digital Versatile Disks (DVD) or other optical storage, magnetic cassettes, magnetic tape, magnetic disk storage or other magnetic storage devices, or any other tangible, physical medium which can be used to store the desired information and which can be accessed by the server 700. Any such non-transitory computer-readable media may be part of the server 700.

In some implementations, the transceivers 710 include any sort of transceivers known in the art. For example, the transceivers 710 may include wired communication components, such as an Ethernet port, for communicating with other networked devices. Also, or instead, the transceivers 710 may include wireless modem(s) to facilitate wireless connectivity with other computing devices. Further, the transceivers 710 may include a radio transceiver that performs the function of transmitting and receiving radio frequency communications via an antenna.

In some implementations, the output devices 712 include any sort of output devices known in the art, such as a display (e.g., a liquid crystal display), speakers, a vibrating mechanism, or a tactile feedback mechanism. Output devices 712 also include ports for one or more peripheral devices, such as headphones, peripheral speakers, or a peripheral display.

In various implementations, input devices 714 include any sort of input devices known in the art. For example, input devices 714 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

We claim:

1. A method of detecting an object within a wireless communication network, the method comprising:
   receiving, by a device configured to communicate over the wireless communication network and receive transmission signals within the wireless communication network, a millimeter-wave (mmW) transmission within the wireless communication network;
   monitoring, by the device, a first signal strength pattern of the mmW transmission being received;
   detecting, by the device, a second signal strength pattern of the mmW transmission being received, wherein the second signal strength pattern indicates a lower signal strength of the mmW transmission with respect to the first signal strength pattern;
   comparing the second signal strength pattern with base signal strength patterns stored in a database;
   based at least in part on the comparing, identifying a type of object between the device and a source of the mmW transmission; and
   based at least in part on the identifying, performing an action.

2. The method of claim 1, wherein the device comprises a mobile device configured for operation in the wireless communication network.

3. The method of claim 1, wherein the mmW transmission is in one of a 28 Giga Hertz (GHz) band or a 39 GHz band.

4. The method of claim 1, wherein performing the action comprises generating a traffic report related to vehicular traffic.

5. The method of claim 1, wherein performing the action comprises generating an alert.

6. The method of claim 5, wherein the alert relates to an impending arrival of a vehicle.

7. The method of claim 1, wherein performing the action comprises at least one of activating one or more lights or sounding an alarm.

8. A non-transitory storage medium comprising instructions stored thereon, the instructions being executable by one or more processors to:
   receive, by a device configured to communicate over a wireless communication network and receive transmission signals within the wireless communication network, a millimeter-wave (mmW) transmission within the wireless communication network;
   monitor a first signal strength pattern of the mmW transmission being received;
   detect a second signal strength pattern of the mmW transmission being received, wherein the second signal strength pattern indicates a lower signal strength of the mmW transmission with respect to the first signal strength pattern;
   compare the second signal strength pattern with base signal strength patterns stored in a database;
   based at least in part on comparing, identify a type of object between a device including the non-transitory storage medium and a source of the mmW transmission; and
   based at least in part on the identifying, perform an action.

9. The non-transitory storage medium of claim 8, wherein the device comprises a mobile device configured for operation in the wireless communication network.

10. The non-transitory storage medium of claim 8, wherein the mmW transmission is in one of a 28 Giga Hertz (GHz) band or a 39 GHz band.

11. The non-transitory storage medium of claim 8, wherein the action comprises generating a traffic report related to vehicular traffic.

12. The non-transitory storage medium of claim 8, wherein the action comprises generating an alert.

13. The non-transitory storage medium of claim 12, wherein the alert relates to an impending arrival of a vehicle.

14. The non-transitory storage medium of claim 8, wherein the action comprises at least one of activating one or more lights or sounding an alarm.

15. An apparatus configured to communicate over a wireless communication network and receive transmission signals within the wireless communication network, the apparatus comprising:
   one or more processors; and a non-transitory storage medium comprising instructions stored thereon, the instructions being executable by the one or more processors to:
receive a millimeter-wave (mmW) transmission within the wireless communication network;
monitor a first signal strength pattern of the mmW transmission being received;
detect a second signal strength pattern of the mmW transmission being received, wherein the second signal strength pattern indicates a lower signal strength of the mmW transmission with respect to the first signal strength pattern;
compare the second signal strength pattern with base signal strength patterns stored in a database;
based at least in part on comparing, identify a type of object between the apparatus and a source of the mmW transmission; and
based at least in part on the identifying, perform an action.

16. The apparatus of claim 15, wherein the apparatus comprises a mobile device configured for operation in the wireless communication network.

17. The apparatus of claim 15, wherein the mmW transmission is in one of a 28 Giga Hertz (GHz) band or a 39 GHz band.

18. The apparatus of claim 15, wherein the action comprises generating a traffic report related to vehicular traffic.

19. The apparatus of claim 15, wherein the action comprises generating an alert relating to an impending arrival of a vehicle.

20. The apparatus of claim 15, wherein the action comprises at least one of activating one or more lights or sounding an alarm.

* * * * *